Dec. 24, 1940. T. BROWN ET AL Re. 21,667

POWER LIFT MECHANISM

Original Filed Oct. 8, 1938 3 Sheets-Sheet 1

INVENTORS
THEOPHILUS BROWN
TALBERT W. PAUL
BY
ATTORNEYS

Dec. 24, 1940. T. BROWN ET AL Re. 21,667

POWER LIFT MECHANISM

Original Filed Oct. 8, 1938 3 Sheets-Sheet 2

INVENTORS
THEOPHILUS BROWN
TALBERT W. PAUL
BY
ATTORNEYS

Dec. 24, 1940. T. BROWN ET AL Re. 21,667

POWER LIFT MECHANISM

Original Filed Oct. 8, 1938 3 Sheets-Sheet 3

INVENTORS
THEOPHILUS BROWN
TALBERT W. PAUL
BY E. B. Boffey & C. T. Parker
ATTORNEYS Reissued Dec. 24, 1940

Re. 21,667

UNITED STATES PATENT OFFICE 21,667

POWER LIFT MECHANISM

Theophilus Brown and Talbert W. Paul, Moline, Ill., assignors to Deere & Company, Moline, Ill., a corporation of Illinois Original No. 2,175,246, dated October 10, 1939, Serial No. 233,963, October 8, 1938. Application for reissue August 15, 1940, Serial No. 352,820

14 Claims. (Cl. 97—50)

The present invention relates to power lift mechanisms for tractors adapted to utilize power from the tractor motor for raising and lowering implements associated with the tractor.

With certain agricultural implements, such as cultivators, planters, etc., it is the practice to mount one set of tools on one portion of the tractor and a second set of tools on another portion thereof, both sets of tools being raised simultaneously from ground engaging position to inoperative position by means of a half-revolution lifting clutch driven from the tractor motor. These soil engaging tools must be raised rather high in order to clear the ground, and a high movement gain leverage system must be employed if the tools are to be raised with a single one-half revolution of the power lift clutch. It frequently happens that the load placed upon the half revolution clutch is so great that the mechanism will not function properly to lift the soil engaging implement under adverse conditions.

The principal object of the present invention is to provide lifting mechanism operated by a conventional half-revolution lifting clutch, which is capable of lifting heavy implements under the conditions pointed out above without overloading the clutch mechanism.

More specifically, it is an object of the present invention to provide power lift mechanism of the half revolution clutch type for raising two separate sets of tools in successive cycles of operation of the clutch, thereby dividing the work of lifting between two lifting cycles of the clutch and decreasing the stresses imposed upon the clutch and lifting connections.

Another object is in connection with ground working implements such as cultivators and the like wherein one set of tools is mounted forwardly on the tractor and another set is mounted rearwardly on the tractor, and resides in the provision of power lift mechanism which will automatically raise the front and rear sets of tools in proper time sequence so that the lifting of the rear set of tools is delayed after the raising of the front set until the tractor has advanced a distance approximately equal to the distance between the two sets of tools. By this arrangement the rows may be worked all the way to their ends with both sets of tools, eliminating the portions of rows heretofore worked on by the front set of tools alone when both sets of tools were raised simultaneously.

A further object of the present invention is to provide mechanism having the above characteristic operation which can be readily mounted on the tractor as an attachment to derive its energy from the motor thereof, without necessitating the replacement of original tractor parts or otherwise making extensive alterations in the design of the tractor.

These and other objects and advantages of the present invention will become apparent after a consideration of the following detailed description of a preferred embodiment thereof, reference being had to the accompanying drawings, in which Figure 1 is a rear view of a power lift mechanism mounted on the rear end of a tractor and embodying the principles of our invention;

Figure 10:
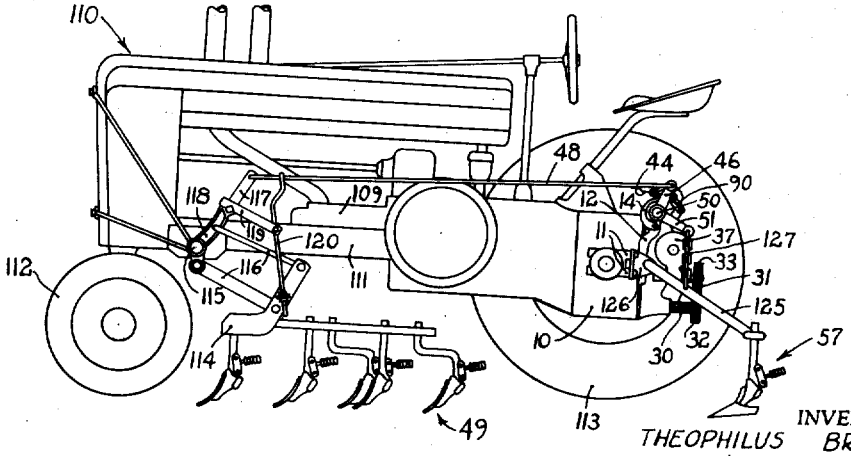
Figure 8:
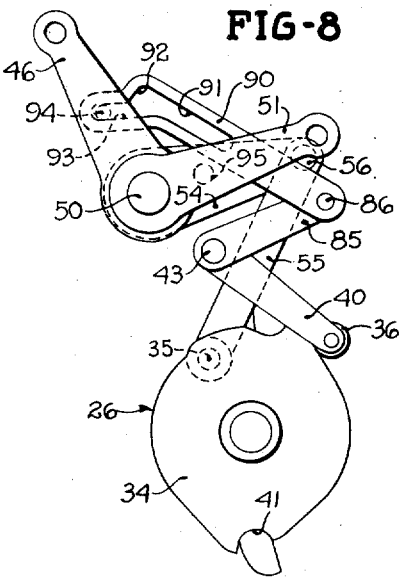
Figure 9:
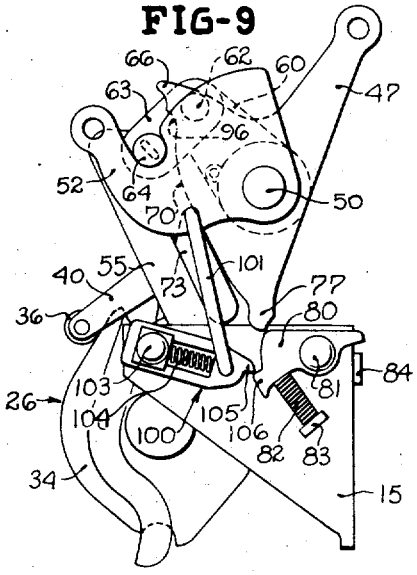

Figures 8 and 9 are diagrammatic left and right end views, respectively, showing the mechanism a moment after having been tripped to lower both sets of tools and showing one pair of lifting arms in motion and the second pair at the instant of being released; and Figure 10 is a side elevation of a tractor having front and rear cultivator rigs mounted thereon, and a power lift mechanism embodying the principles of the present invention.

Figure 1:
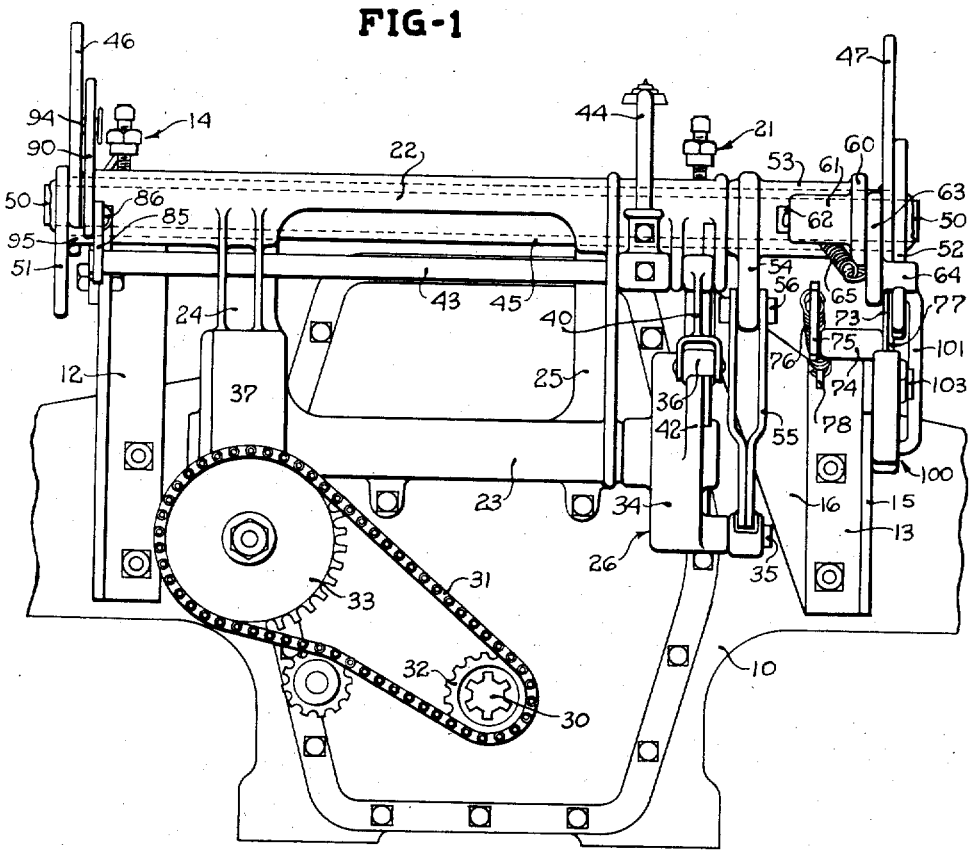
Figure 2:
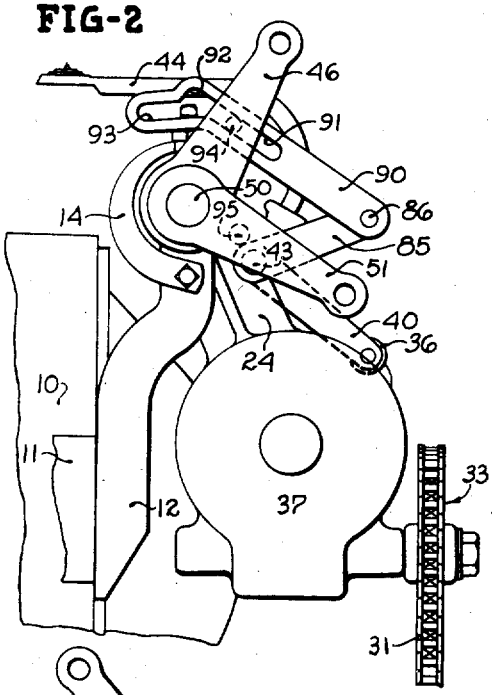
Figure 2 is a side elevation, as viewed from the left, of the mechanism in Figure 1, showing both lifting arms in the lowered position.
Figure 3:
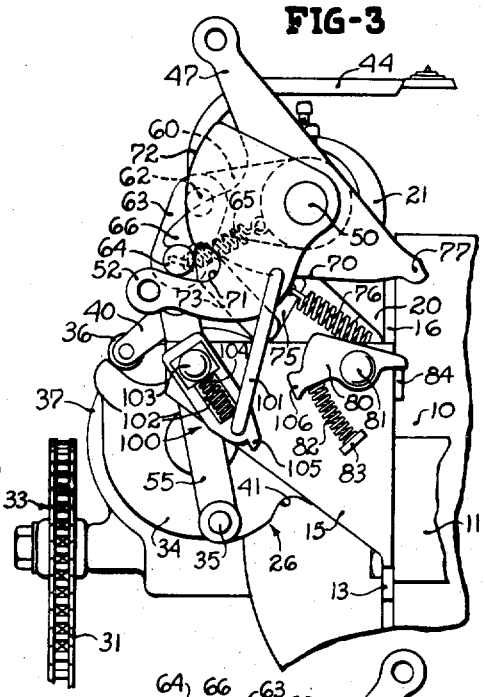
Figure 3 is a side elevation, as viewed from the right, of the mechanism shown in Figure 1.

Referring now to the drawings and more particularly to Figures 1, 2 and 3, the reference numeral 10 indicates the rear axle housing of a tractor, and bolted to suitable mounting bosses 11 provided on the back side of the axle housing are a pair of laterally spaced vertically disposed brackets 12 and 13. The left hand bracket 12 is preferably made up of angle iron, the upper end of which is bent outwardly away from the axle housing and has a suitable cradle in which the power lift housing is carried. The general construction of the power lift housing, together with the means for mounting the same on the tractor rear axle housing, and the driving connections by which the mechanism is driven from the tractor power take-off shaft are shown in more detail in a co-pending application, Serial No. 199,681, filed April 2, 1938 by Theophilus Brown, now Patent No. 2,196,053, issued April 2, 1940, to which reference may be had. Suitable clamping means 14 are provided for locking the power lift housing to the bracket 12. The right hand bracket 13 includes a rearwardly extending vertical flange 15 of generally triangular shape, and a laterally inwardly extending flange 16 having a rearwardly and upwardly extending portion 20 which is likewise provided with a suitable cradle in which the right end of the power lift housing is carried. Clamping means 21 similar to the clamp 14 lock the housing to the bracket portion 20.

The power lift housing is preferably in the form of a casting having two vertically spaced transverse pipe portions 22 and 23 joined together by a pair of laterally spaced arms 24 and 25. A conventional half revolution clutch 26 is disposed at the right end of the lower pipe portion 23 and consists, generally, of a normally rotating driving member (not shown) driven from a power take-off shaft 30 extending rearwardly from the tractor axle housing through the agency of a driving chain 31 trained over sprockets 32 and 33 and suitable power transmitting means in the form of a worm and worm gear, disposed within a housing portion 37 and connected to drive a shaft in the lower housing portion 23, to which the clutch driving member is connected. The clutch also includes a normally stationary driven member 34 having a laterally extending crank pin 35. The clutch driven member 34 is locked stationary with respect to the power lift housing and is held out of engagement with the clutch driving member by means of a roller 36 journaled in the bifurcated end of a tripping arm 40, said roller being adapted to engage one of two diametrically opposite recesses 41, 41 formed in a radial flange 42 on the clutch driven member 34. The tripping arm 40 extends downwardly and rearwardly from a transverse rock shaft 43 journaled in suitable bearings in the housing arms 24, 25, and the said rock shaft is actuated by a foot pedal 44 fixed to the shaft 43 and extending upwardly and forwardly therefrom to within easy reach of the operator at his station on the tractor. When the roller 36 is lifted out of its seat in the recess 41 by depressing the foot pedal 44, the engaging mechanism contained within the clutch 26 is actuated in a manner well known in the art, and the driven member 34 is engaged with the driving member and caused to rotate therewith through one half revolution. At the completion of the half revolution together, the roller 36 is adapted to drop into the other recess 41 causing the clutch driving and driven members to be automatically disengaged and locking the driven member 34 stationary with respect to the power lift housing except as the conventional operation of this device is modified in carrying out the principles of this invention, as will be described.

Journaled within the upper transverse pipe portion 22 of the power lift housing is a sleeve 45 (Figure 1), the ends of which project somewhat beyond the ends of the pipe 22, and rigidly fixed to the opposite ends of the sleeve 45 are lifting arms 46 and 47, which are adapted to be connected to lifting mechanism associated with an implement on the tractor, as for instance, to push rods 48 (see Figure 10) extending forwardly to a cultivator 49 mounted at the front of the tractor and familiar to those skilled in the art. A shaft 50 is rotatably disposed within the sleeve 45 and projects somewhat beyond the ends thereof, and rigidly fixed to the opposite ends of the shaft are lifting arms 51 and 52, which are adapted to be connected to lifting mechanism associated with other implement means on the tractor, as for instance, to a cultivator 57 or planter mounted at the rear of the tractor below the arms 51, 52 according to well known arrangements. A hub member 53 is journaled on the sleeve 45 between the right end of the pipe 22 and the lifting arm 47 and has an integral arm 54 extending downwardly and rearwardly therefrom. The free end of the arm 54 is connected with the crank pin 35 on the clutch driven member 34 by a link 55, the latter being preferably in the form of two straps joined together at their lower ends and spread apart at their upper ends to receive between them the arm 54. A pin 56 connects the link 55 with the arm 54. Another integral arm 60 extends rearwardly from the hub 53 and is provided at its end with a bearing 61 in which is journaled the laterally inwardly extending pivot pin 62 of a link 63. At the other end of the link 63 is a laterally outwardly extending pin 64, the purpose of which will be disclosed presently. A spring 65 is fastened to the free end of the link 63 and anchored to a suitable lug on the hub member 53, exerting a counter-clockwise turning force (Figure 3) on the link 63.

The right hand lifting arm 47 is formed with a projection 66 extending above and adapted to engage the pin 64, and a cam surface 70. The other right hand lifting arm 52 is formed with a curved bearing surface 72 arcuate about the axis of the shaft 50, and a recess 71 at the bottom of the arcuate portion 72 adapted to receive the pin 64 of the link 63. A cam follower 73, preferably in the form of a bell crank having its hub portion journaled in a bearing 74 carried on the bracket flange 15, bears against the cam surface 70 and holds the pin 64 out of the recess 71 when both of the lifting arms 47, 52 are in the lowered position shown in Figure 3. The second arm 75 of the bell crank is connected to a spring 76 which is anchored to a lug 78 on the mounting bracket 13 and exerts a clockwise turning force (Figure 3) on the bell crank to hold the cam follower 73 against the cam surface 70.

Figure 4:
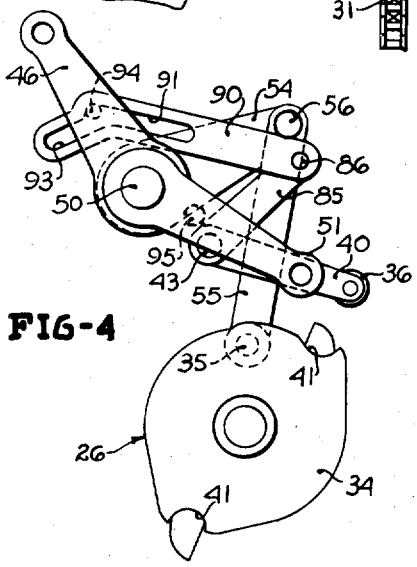
Figures 4 and 5 are diagrammatic left and right end views, respectively, of the mechanism, but omitting the details of the tractor, supporting brackets, etc., showing one pair of lifting arms in raised position after one half revolution of the lifting clutch, some of the mechanism being omitted from each view for the sake of clearness.
Figure 5:
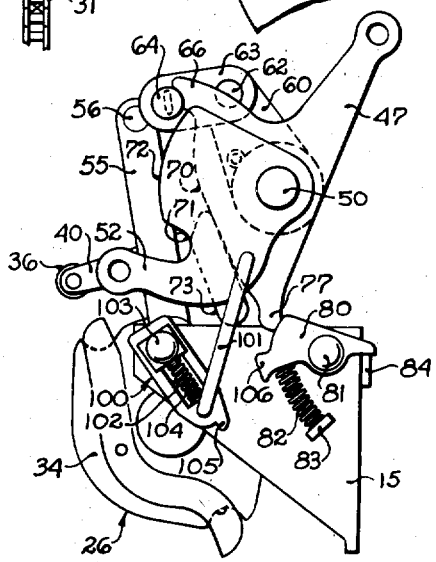

When the lifting clutch 26 is actuated and the driven member 34 rotates through one half revolution, the link 55 is raised, rocking the arm 54 and hub member 53, and swinging the arm 60 upwardly (Figure 3). The pin 64 of the link 63 engages the lifting arm projection 66 and carries the latter upwardly and forwardly with it, thereby rocking the sleeve 45 and both attached lifting arms 47 and 46 to the positions shown in Figures 4 and 5. As the lifting arm 47 reaches its extreme forward position, a projecting catch 77 on the arm engages a detent member 80 pivoted on a pin 81 on the bracket flange 15. A clockwise turning force is exerted against the detent member 80 by a spring 82 which is connected to a lug 83 formed on the flange 15, and the turning of the detent member in a clockwise direction is limited by a limit stop 84, also provided on the flange 15. Thus, as the lifting arm catch 77 comes into contact with the detent member 80, the latter is rocked in a counter-clockwise direction against the pressure of the spring 82 until the catch has cleared the detent and allowed the latter to return to its normal position against the limit stop 84.

Fixed to the left end of the rock shaft 43 is a rearwardly extending arm 85 which is pivotally connected by a pin 86 at its outer end to a link 90. The link 90 is provided with a slot 91 having a shoulder 92 and a branch 93, and the slot 91 embraces a pin 94 fixed to and extending laterally inwardly from the lifting arm 46. As the arm 46 is raised by the rocking action of the sleeve 45, the pin 94 slides along the slot 91 and engages the shoulder 92, carrying the link 90 with it bodily for the remainder of the stroke to rock the shaft 43 and lift the arm 40 and roller 36 clear of the clutch 26. Thus, at the completion of the half revolution of the clutch 26, the roller 36 is not in position to disconnect the clutch and the clutch driven member 34 therefore continues to rotate with the driving member for another half revolution cycle.

As the lifting link 55 moves downwardly with the clutch on the second half revolution of the driven member 34, the hub member 53, together with the link 63, swing downwardly, leaving the lifting arms 46 and 47 locked in raised position by the detent member 80. The pin 64 slides along the face of the arcuate portion 72 of the lifting arm 52 and at the bottom of its stroke is pulled into seating engagement in the recess 71 by the spring 65. The cam follower 73 which had heretofore held the pin 64 out of the recess 71 is now inoperative, by virtue of the fact that in the advanced position of the lifting arm 47, the cam 70 permits the spring 76 to retract the follower 73 out of alignment with the recess 71.

Figure 6:
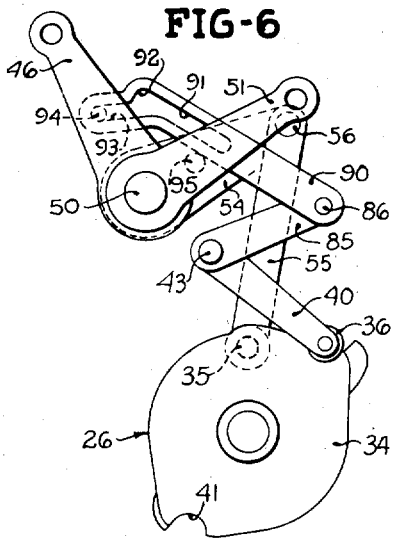
Figures 6 and 7 are diagrammatic left and right end views, respectively, similar to Figures 4 and 5 but showing both pairs of lifting arms in raised position after three half-revolutions of the clutch.

In the meantime, the tripping arm 40 and roller 36 are still held out of contact with the clutch 26 by the engagement of the pin 94 with the shoulder 92 of the link 90, and in consequence thereof the driven clutch member 34 continues to rotate with the driving member through a third half revolution. As the hub member 53 and link 63 swing upwardly again with the link 55, the lifting arm 52 is carried with them by reason of the engagement of the pin 64 in the recess 71, and the shaft 50 is rocked within the sleeve 45, causing the left hand lifting arm 51 to swing upwardly in a like manner. A pin 95 on the left hand lifting arm 51 engages the link 90 and lifts the latter sufficiently to disengage the shoulder 92 from the pin 94, allowing the tripping arm 40 and roller 36 to drop by gravity into engagement with the clutch 26, thereby restoring the clutch mechanism to normal, whereupon the roller 36 is free to seat in the recess 41 at the proper time to disengage the driven member 34 from the driving member, and to lock the driven member 34 and all of the lifting connections in the raised position shown in Figures 6 and 7. As the roller 36 on the tripping arm 40 drops into engagement with the clutch, the link 90 slides downwardly and the pin 94 takes a position in the end of the branch 93 of the slot 91.

Figure 7:
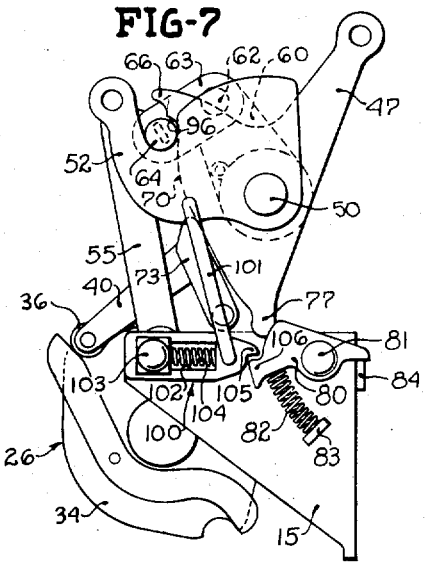

It will be noted in Figure 7 that the pin 64 clears the projection 66 when raised the second time so that the lifting clutch 26 is not called upon to engage and raise the lifting arms 46 and 47 at the same time that the lifting arms 51 and 52 are being raised. This is accomplished by providing relief at 96 in the lifting arm projection 66.

A pawl 100 is mounted on the bracket flange 15 and is connected to the lifting arm 52 by a link 101. The pawl 100 is provided with a slot 102 which slidably engages the shank of a pin 103, and the latter is pivoted on the bracket flange 15. A compression spring 104 is disposed within the slot 102 and bears against one end thereof, the other end of the spring bearing against the pin 103 to hold the pawl with the pin 103 in the end of the slot. As the lifting arm 52 is raised, the pawl 100 is swung upwardly with it by the link 101 and near the top of its movement engages and slides over the detent 80. In doing so, the pawl 100 slides rearwardly over the pin 103 against the pressure of the spring 104, and when the detent has been cleared, slides forwardly again under the influence of the spring.

To lower the lifting arms 46, 47 and 51, 52, the foot pedal 44 is depressed to actuate the clutch 26, causing the driven member 34 to engage the driving member and to move the link 55 downwardly. Inasmuch as the link 55 is the sole support for holding the lifting arms 51, 52 in raised position, the latter arms swing downwardly with the link, turning the pawl 100 on its pivot 103 through the link 101. A catch 105 on the pawl 100 engages a shoulder 106 on the detent 80 and swings the latter downwardly against the spring 82 (Figure 9) to release the catch 77 and allow the lifting arms 46, 47 to return to lowered position as the attached ground working tools (not shown) fall to the ground by gravity. Thus, both sets of tools will be lowered substantially simultaneously.

Referring to Figure 10, the tractor 110 comprises a frame 11 carried on dirigible front wheels 112 and rear traction wheels 113 driven by a suitable engine 109. The tractor-mounted cultivator is of any suitable conventional type including front rigs 49 and rear rigs 57. The front rigs 49 on each side of the tractor are mounted on a supporting frame 114, which is connected to a main beam 115 by vertically spaced, substantially parallel draft links 116. The main beam 115 is mounted at its inner end on the tractor frame 111 and extends laterally therefrom. The push rod 48 extends forwardly from its connection with the lifting arm 46 and is connected to one arm 117 of a bell crank which is pivotally mounted on a bracket 118 on the main beam 115. The other arm 119 of the bell crank is connected by a link 120 to the rig supporting frame 114. When the power lift arm 46 swings forwardly the bell crank arm 119 is raised, thereby lifting the rigs through the link 120.

The rear rigs 57 include an arm 125 pivoted to a bracket 126 which is bolted to the bosses 11 on the axle housing 10. The power lift arm 51 is connected by a chain 127 to the arm 125 for lifting the latter when the arm 51 swings upwardly.

By this arrangement, the front rigs 49 are raised first, leaving the rear rigs in the ground until the tractor has advanced a distance substantially equal to the distance between the front and rear rigs before raising the latter to inoperative position.

What we claim as our invention is:

1. Power lift mechanism for a tractor, comprising in combination, an oscillating element, means receiving power from the tractor engine for oscillating said element and including control means for interrupting said oscillating movement after a certain cycle of operation, a pair of independently swingable lifting arms, means engaging said element with one of said arms for swinging the latter from an initial to a final position during a first cycle, means for locking said one arm in said final position, and means for rendering said control means inoperative to interrupt said oscillating movement, causing said element to complete another cycle of operation, and means for engaging said element with the other of said arms to swing the latter during the following cycle to its final position, said control means being released for normal operation during the movement of said second arm to interrupt the oscillation of said elements after both arms are in their final positions.

2. Power lift mechanism comprising, in combination, a power driven clutch device having a rotatable driven member and mechanical means for automatically disconnecting the latter after one cycle of operation, an oscillating element connected to said driven member to be oscillated thereby, a pair of independently swingable lifting arms, means engaging said element with only one of said arms for swinging the latter from an initial to a final position during a first cycle of operation of said clutch, detent means for holding said one arm in said final position, and means for holding said disconnecting means inoperative while said oscillating member engages the other of said arms during another cycle of operation to swing the latter from an initial to a final position.

3. Power lift mechanism comprising, in combination, a supporting structure, at least two lifting arms journaled on said supporting structure, a half revolution lifting clutch carried on said structure and having a normally rotating driving member and a normally stationary driven member, actuating means for engaging said driven member with said driving member, link means connected with said clutch driven member and adapted to engage and raise one of said lifting arms during the first half revolution thereof, means for locking said arm in raised position, means cooperating with said actuating means to prevent the disengagement of said clutch at the completion of the first half revolution, said link means engaging and raising the second of said lifting arms during a subsequent half revolution of the clutch driven member, and means for disengaging said clutch after said second lifting arm has been raised.

4. Power lift mechanism comprising, in combination, a supporting structure, at least two lifting arms journaled on said supporting structure for rocking between lowered and raised positions, a half revolution lifting clutch carried on said structure and comprising a normally rotating driving member, a normally stationary driven member, and actuating means cooperating with said clutch to engage said driven member with said driving member, a hub member journaled on said supporting structure and operatively connected with said clutch for rocking movement when the clutch is operated, link means on said hub member adapted to engage and raise one of said lifting arms with the first half revolution of said clutch, means for locking said arm in raised position, means responsive to the position of said arm for preventing the disengagement of said clutch at the completion of the first half revolution thereof, said link means being adapted to engage and raise the second of said lifting arms during a subsequent half revolution of the clutch, and means responsive to the position of said second arm for disengaging said clutch.

5. Power lift mechanism comprising, in combination, a supporting structure, at least two lifting arms journaled on said supporting structure for rocking between lowered and raised positions, a half revolution lifting clutch carried on said structure and comprising a normally rotating driving member, a normally stationary driven member, and tripping means normally engaged with said driven member to restrain the same against rotation, said driven member being engaged with said driving member and rotating therewith when said tripping means is disengaged from said driven member, a hub member journaled on said supporting structure for rocking about the axis of said lifting arms, link means operatively connecting said hub member with said clutch driven member, spring biased link means on said hub member adapted to engage and raise the first of said lifting arms during the first half revolution of said clutch, detent means on said supporting structure for locking said first arm in raised position, means actuated by said first arm for holding said tripping means out of engagement with said clutch driven member, said spring biased link means being adapted to engage and raise the second of said lifting arms during a subsequent half revolution of said clutch, means responsive to the position of said second arm for engaging said tripping means with said clutch, and means responsive to the downward movement of said second arm for disabling said detent means and releasing said first arm.

6. Power lift mechanism comprising, in combination, a supporting structure, at least two lifting arms journaled on said supporting structure for rocking between lowered and raised positions, a half revolution lifting clutch carried on said structure and comprising a normally rotating driving member, a normally stationary driven member, and a tripping arm pivoted on said supporting structure and adapted to engage said driven member to hold the latter against rotation, said clutch being actuated by the disengagement of said tripping arm from said driven member, a hub member journaled on said supporting structure for rocking about the axis of said lifting arms, operating connection between said clutch driven member and said hub member whereby the latter is rocked in one direction during one-half revolution of said clutch driven member and in the opposite direction during the other half revolution, link means on said hub member adapted to engage and raise the first of said lifting arms when said hub member is rocked by the first half revolution of said clutch, detent means on said supporting structure engageable with said first lifting arm to lock the same in raised position, means actuated by said first arm for holding said tripping arm out of engagement with said clutch driven member, said hub member being rocked back to its normal position by the second half revolution of said clutch, said link means being adapted to engage and raise the second of said lifting arms when said hub member is rocked by the third half revolution of said clutch, and means on said second arm for releasing said tripping arm into engagement with said clutch when said second arm has reached an elevated position.

7. In combination with a tractor having a body and an engine driven power take-off shaft extending outwardly therefrom, power lift mechanism comprising a housing, means for mounting said housing on said tractor body, a half revolution lifting clutch carried on said housing, operating connections for driving said clutch from said power take-off shaft, actuating means for engaging said clutch, at least two lifting arms supported on said housing for rotation about a common axis, a hub member journaled for rotation about the axis of said lifting arms, means connecting said clutch with said hub member to rock the latter when said clutch is actuated, spring biased link means on said hub member adapted to engage the first of said lifting arms, means cooperating with said first lifting arm for holding said link means out of engagement with the second of said lifting arms when said first lifting arm is in lowered position, said first lifting arm being raised by said link means when said hub member is rocked by the first half revolution of said clutch, detent means for locking said first lifting arm in raised position, means responsive to the position of said first lifting arm for disabling said clutch actuating means and continuing the operation of said clutch, said hub member being returned to its original position by the second half revolution of said clutch, said link means engaging said second lifting arm and raising the same when the hub member is rocked by the third half revolution of said clutch, and means responsive to the position of said second lifting arm for releasing said clutch actuating means from said disabling means to effect the disengagement of said clutch.

8. In combination with a tractor having a rear axle housing and a power take-off shaft projecting rearwardly therefrom, power lift mechanism comprising a housing, bracket means for mounting said housing on said rear axle housing, a half revolution lifting clutch, driving connections for driving said clutch from said power take-off shaft, a tripping arm pivotally connected with said housing and adapted to cooperate with said clutch to actuate the same, a transverse sleeve journaled in said housing and having a pair of lifting arms fixedly mounted on opposite ends thereof, a shaft rotatably disposed within said sleeve and extending outwardly beyond the ends thereof, a pair of lifting arms fixedly mounted on opposite ends of said shaft, a hub member journaled on said sleeve adjacent one end thereof, means connecting said clutch with said hub member to rock the latter when said clutch is actuated, spring biased link means on said hub member adapted to engage the adjacent lifting arm on said sleeve, a cam surface on said sleeve mounted arm, a cam follower cooperating with said cam surface to hold said link means out of engagement with the corresponding lifting arm on said shaft when both arms are lowered, said sleeve mounted arms being raised by said link means when said hub member is rocked by the first half revolution of said clutch, a detent member on said bracket means for locking said sleeve mounted arms in raised position, lost motion means connecting one of said sleeve mounted lifting arms with said tripping arm for disabling the latter when the lifting arms have reached an elevated position, said hub member being returned to its original position by the second half revolution of said clutch, said link means engaging said shaft mounted arm and raising the same when said hub member is rocked by the third half revolution of said clutch, means on one of said shaft mounted lifting arms for releasing said tripping arm from said lost motion means to disengage said clutch when both pairs of arms have been raised, and means responsive to the downward movement of said shaft mounted lifting arms for disabling said detent member and releasing said sleeve mounted arms.

9. For use with an engine driven tractor, the combination of implements movably mounted thereon adjacent the forward and rearward ends thereof, respectively, a single self-interrupting clutch operatively connected with the tractor engine, and mechanism for transmitting power from said clutch to said implements to move the latter, said mechanism including means for associating said clutch with one of said implements, whereby said one implement is raised first, means responsive to the movement of said one implement to a certain position for disassociating said clutch therefrom and associating said clutch with the other implement, for causing said second implement to be raised after the first implement has been lifted for successively moving said implements in a predetermined sequence.

10. For use with an engine driven tractor, the combination of implements movably mounted thereon adjacent the forward and rearward ends thereof, respectively, an engine-actuated device including an optionally rotative member, and mechanism for connecting said member with said implements to move the latter by power transmitted by said member, said mechanism including means for successively moving said implements in a predetermined sequence comprising mechanism establishing an operative relation with one of said implements to raise the latter, and control means responsive to the arrival of said implement at a certain raised position, for disassociating said mechanism from said implement and establishing an operative lifting relation with the other of said implements.

11. For use with an engine driven tractor, the combination of implements mounted at different locations on the tractor by means providing for independent movement thereof between operative and inoperative positions, an engine actuated device for moving said implements comprising a normally rotating member, a normally stationary member, and control means for optionally connecting said members to rotate together, and means for connecting said normally stationary member with one of said implements adapted to transmit power to move said implement from one position to another, and means responsive to the arrival of said one implement at a certain raised position for disconnecting said normally stationary member therefrom, and connecting the member to another of said implements upon a single actuation of said control means.

12. For use with an engine driven tractor, the combination of implements mounted at different locations on the tractor by means providing for independent movement thereof between operative and inoperative positions, an engine actuated device for moving said implements comprising a normally rotating member, a normally stationary member, and control means for optionally connecting said members to rotate together, and means for connecting said normally stationary member first with one of said implements and then with the other to move said implements successively from one position to another upon a single actuation of said control means, including means responsive to the completion of the raising movement of said one implement for transferring the connection of said normally stationary member to said other implement.

13. The combination with a motor propelled vehicle, of an implement mounted for vertical movement on the front of the vehicle, a second implement mounted for vertical movement on the rear of the vehicle, a power lift mechanism connected with the motor of the tractor to be operated thereby, a lifting member connected with the implement at the front of the tractor, a second lifting member connected with the implement at the rear of the tractor, means connecting said first lifting member with said power lift mechanism to be operated thereby to lift the implement at the front of the tractor, means responsive to the movement of said lifting member to a certain position for disconnecting said first lifting member from said power lift mechanism, locking said member in raised position, and connecting said second lifting member with said power lift mechanism to be operated thereby to lift the implement at the rear of the tractor.

14. The combination with a motor propelled vehicle, of two separate implements mounted at different points on the vehicle for movement relative to the vehicle, a power lift mechanism connected with the motor of the tractor to be operated thereby, a lifting device connected with one of said implements, a second lifting device connected with the other of said implements, means for connecting said lifting devices with said lift mechanism to be successively operated thereby, means responsive to the lifting of one implement to a lifted position for holding said first implement in such raised position independently of the continued operation of said lift mechanism and for initiating the lifting of said second implement.

THEOPHILUS BROWN.
TALBERT W. PAUL.